US008166765B2

(12) United States Patent
Baker et al.

(10) Patent No.: US 8,166,765 B2
(45) Date of Patent: May 1, 2012

(54) FUEL DELIVERY AND CONTROL SYSTEM INCLUDING A VARIABLE DISPLACEMENT ACTUATION PUMP SUPPLEMENTING A FIXED DISPLACEMENT MAIN PUMP

(75) Inventors: Carthel C. Baker, Oregon, IL (US); Joe F. Wollschlager, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 843 days.

(21) Appl. No.: 12/252,006

(22) Filed: Oct. 15, 2008

(65) Prior Publication Data

US 2010/0089026 A1  Apr. 15, 2010

(51) Int. Cl.
F02C 1/00 (2006.01)

(52) U.S. Cl. ........... 60/772; 60/39.281; 60/235; 60/243; 60/734; 137/563; 137/565.33; 417/286; 417/287

(58) Field of Classification Search ............... 60/39.281, 60/734, 773, 235, 243; 137/565.33; 417/426–428
See application file for complete search history.

(56) References Cited

U.S. PATENT DOCUMENTS

| 3,801,228 | A | * | 4/1974 | Mueller ................ 60/39.281 |
| 4,245,964 | A | | 1/1981 | Rannenberg |
| 4,429,528 | A | * | 2/1984 | Matthews et al. ........ 60/39.281 |
| 4,591,317 | A | | 5/1986 | Markunas |
| 4,805,658 | A | * | 2/1989 | Perkinson et al. ........ 60/39.281 |
| 5,110,269 | A | | 5/1992 | Fallon |
| 5,116,362 | A | | 5/1992 | Arline et al. |
| 5,806,300 | A | * | 9/1998 | Veilleux et al. ........... 60/39.281 |
| 5,918,573 | A | | 7/1999 | Killion |
| 6,487,847 | B1 | * | 12/2002 | Snow et al. ................ 60/764 |
| 6,651,441 | B2 | | 11/2003 | Reuter et al. |
| 7,185,485 | B2 | * | 3/2007 | Lewis ..................... 60/764 |
| 2005/0016176 | A1 | * | 1/2005 | Griffiths et al. .......... 60/734 |
| 2005/0217236 | A1 | | 10/2005 | Wernberg et al. |
| 2006/0266047 | A1 | | 11/2006 | Eick et al. |
| 2007/0199301 | A1 | | 8/2007 | Shelby et al. |
| 2008/0289338 | A1 | * | 11/2008 | Desai ....................... 60/734 |

FOREIGN PATENT DOCUMENTS

| EP | 0 657 651 A1 | 6/1995 |
| EP | 1 662 117 A2 | 5/2006 |
| WO | WO 2007/044020 A2 | 4/2007 |

OTHER PUBLICATIONS

U.S. Appl. No. 12/251,930, filed Oct. 15, 2008, Baker.

* cited by examiner

Primary Examiner — Ehud Gartenberg
Assistant Examiner — Lorne Meade
(74) Attorney, Agent, or Firm — Reinhart Boerner Van Deuren P.C.

(57) ABSTRACT

A fuel delivery and control system is provided including a dual pump fluid circuit configuration comprising a fixed positive displacement pump sized to supply the main engine burn flow ranging from above windmill through cruise and a variable displacement pump sized to supply fluid to engine actuators, valves and other hydraulically operated engine components with a pump flow sharing system interconnecting the two pumps. The combined flow from the two pumps is sufficient to meet the engine flow demand for windmill relight and maximum flow conditions. During cruise or normal operating conditions, the pumps operate in completely isolated flow circuits, minimizing recirculation and therefore heat input into the fuel supply system.

20 Claims, 1 Drawing Sheet

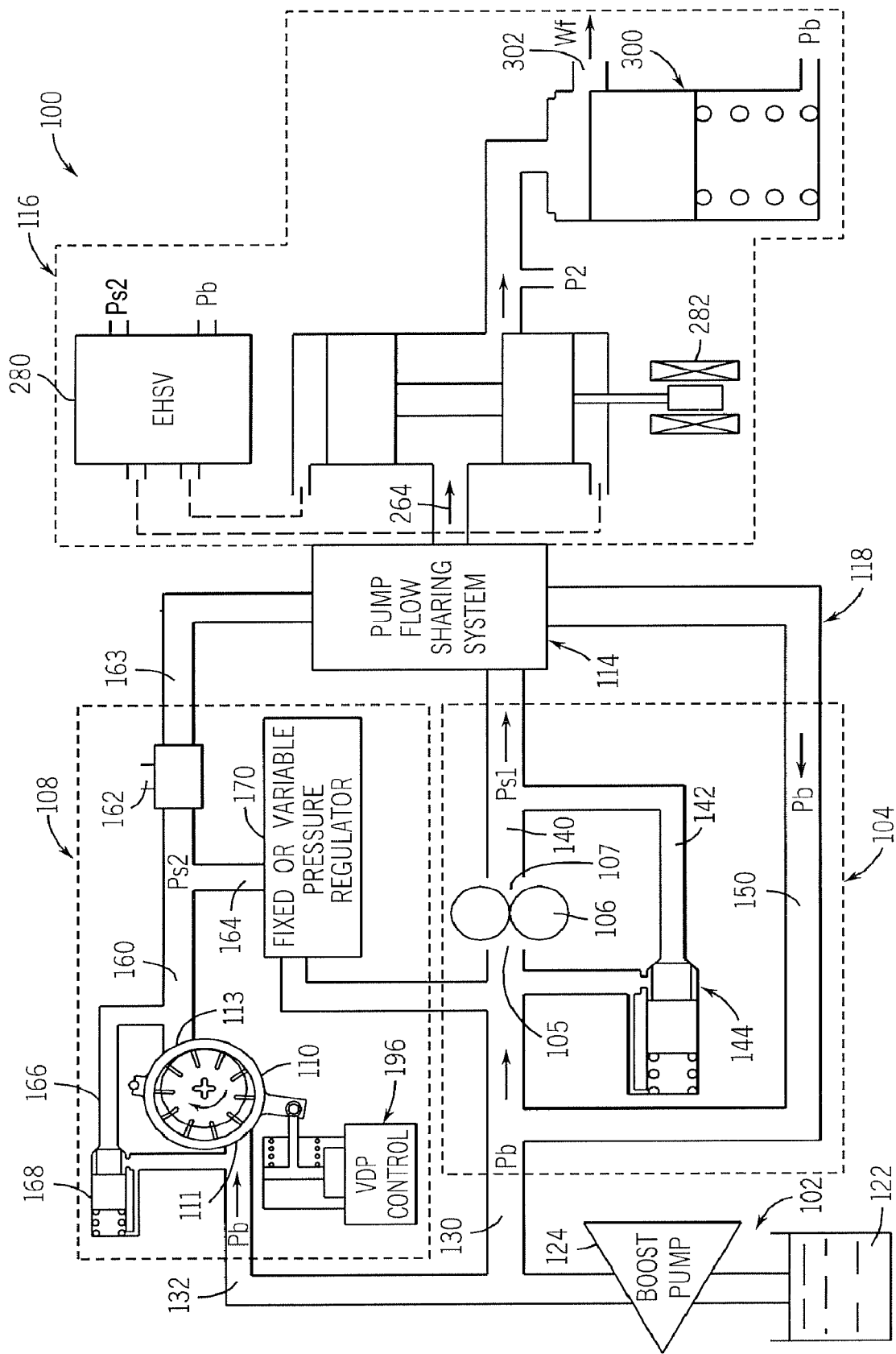

FUEL DELIVERY AND CONTROL SYSTEM INCLUDING A VARIABLE DISPLACEMENT ACTUATION PUMP SUPPLEMENTING A FIXED DISPLACEMENT MAIN PUMP

FIELD OF THE INVENTION

This invention relates generally to fuel delivery systems for gas turbine engines, and more particularly to a thermally efficient, aircraft fuel dual pump and control system for use in gas turbine engine applications.

BACKGROUND OF THE INVENTION

In aviation applications, fuel delivery systems for gas turbine engines typically utilize high pressure, positive displacement pumps to supply high pressure fuel to the engines which power the aircraft. In addition, the high pressure fuel system is often utilized as a source of high pressure fluid for the hydraulic systems and servos which position actuators that control the engine or other aspects of the aircraft.

The positive fixed displacement pumps, sometimes referred to as gear pumps, are driven by the turbine engine through a gearbox. The pump flow rate is thus proportional to engine speed. The main fuel supply pump is sized to supply enough fuel to the engine during windmill start conditions, which are typically about 6 to 10% of normal cruising speed, and/or during maximum power conditions. Accordingly, at many engine operating conditions, the engine flow demand is significantly less than the high pressure flow supplied by the main pump. The excess high pressure pump flow is typically bypassed back to the low pressure inlet of the pump. Raising the pressure of the excess flow and returning the excess flow back to low pressure is effectively wasted energy. This energy is realized as heat input into the fuel and results in undesirable higher fuel temperatures.

Utilizing fixed displacement actuation pumps to supplement the main fuel supply pump can provide a thermal benefit; however, the thermal benefit is realized by running a relatively large actuation pump at relatively low steady state pressures. As such, the thermal benefit of using a fixed displacement actuation pump decreases quickly with increasing actuation pressure.

Accordingly, it would be desirable to provide a fuel delivery and control system for gas turbine engine applications that minimizes the amount of fuel flow in excess of engine fuel flow demand that is raised to high pressure, thus reducing the waste heat energy input to the fuel by the pump. These and other advantages of the invention, as well as additional inventive features, will be apparent from the description of the invention provided herein.

BRIEF SUMMARY OF THE INVENTION

The present invention provides a dual pump, flow sharing fuel delivery and control system providing a fluid circuit arrangement that permits each system pump to be sized for a given flow allocation, allowing combined pump flow at high engine demand requirements, such as windmill starts and other maximum flow demand conditions, and allowing each pump fluid circuit to be isolated from each other during conditions other than peak flow demands.

As such, in certain preferred embodiments of the present invention, a main, fixed positive displacement pump, is provided and sized to supply fuel at cruise burn flow conditions (Wf). In this manner, the main pump is a smaller pump compared to those used in prior art systems, with minimal bypass flow at critical thermal conditions.

A second, variable displacement, actuation pump is used to supply actuation, leakages, and cooling flows and supplements the positive displacement pump that supplies engine burn flow. The displacement of the variable actuation pump is preferably controlled to provide fuel at a sufficient pressure to supply the engine functions and can be controlled to supply the minimum amount of fuel flow required to augment the main fuel supply pump, when required by the engine. The actuation pump displacement is controlled either hydro-mechanically and/or with the FADEC to provide the flow required to supply actuation, servos, leakages, and pressure regulator, when the two pumps are in the isolated pump modes. At nearly all steady state conditions, the displacement of the actuation pump is typically set to a fraction of the available pump displacement. This results in a significant reduction in the amount of bypass flow required at steady state conditions. The pump is providing much less than its total flow capacity which results in much less waste energy. The variable pressure regulator is controlled to set the minimum pressure required to meet the servo and actuation requirements. Lowering the differential pressure across the pump to a value closer to what the system requires, when in isolated pump mode and/or at steady state engine operating conditions also leads to less wasted energy.

The high pressure outlets of the fixed displacement pump and the variable displacement actuation pump are interconnected by a flow sharing system that integrates the flow from the actuation pump to meet engine fuel demands. In certain preferred embodiments of the present invention, the main, fixed positive displacement pump supplies approximately about 20% of the combined flow capacity of the system, with the variable actuation pump supplying approximately about 80% of the combined flow capacity of the system. Dividing the flow in this manner, and providing a flow sharing means to control and isolate each of the pump fluid circuits during steady state and/or idle speed conditions, allows the actuation pump to be operated at a lower discharge pressure than the main supply pump for most thermally critical conditions because it no longer needs to meet the high pressure fuel demand of the engine nozzles at these conditions. As such, there is a significant reduction in the amount of fuel flow in excess of engine fuel flow demand that is pressurized and recirculated back to the low pressure inlet of the actuation pump, thus reducing the waste heat energy input to the fuel by the pump.

The present invention further provides, in part, a system including a main fuel supply pump that supplies substantially no actuation and electrohydraulic servo-valve flow. Accordingly, the fuel metering unit (FMU) discharge pressurizing valve no longer needs to be sized to maintain the minimum differential pressure required to operate the actuators and EHSVs. Lowering the FMU discharge pressurizing valve setting results in a lower delta P across the main, fixed displacement pump when operating on the FMU discharge pressurizing valve. The lower delta P across the main pump results in an additional reduction in the amount of waste heat generated at these conditions.

In addition, the pressure required to operate the engine actuators varies with operating conditions and is typically significantly lower for steady state conditions than for actuation transients. Accordingly, in certain preferred embodiments of the present invention, a variable pressure regulator is included in fluid communication with the variable displacement actuation pump and allows the pump delta P to be varied so that the minimum delta P required to operate the actuators and electrohydraulic servo-valves (EHSVs) can be maintained across the pump. The capability to maintain a lower delta P across the actuation pump combined with the capability to minimize the pump displacement significantly reduces the amount of waste heat generated by the pumping system.

Furthermore, embodiments of the present invention including the variable pressurizing valve regulator can be used to increase delta P across the actuation pump, and therefore, increase temperature within the actuation system for cold starts when fuel temperatures are below freezing. This feature may allow the servo heat-exchanger to be eliminated from the fuel system.

For operating conditions with engine burn flow (Wf) demand from approximately windmill start through cruise, the high pressure discharges of the two pumps are completely isolated from each other. It will be appreciated that the majority of the engine operating time is spent at these conditions. Completely isolating the actuation supply from the Wf supply for most engine operating conditions eliminates the influence of actuation transients on Wf for those conditions.

It will be appreciated that the present invention provides, at least in part, a flow sharing feature that allows the sizing of each of the two pumps to be kept to the minimum. In the absence of flow sharing, the two pumps are typically sized at different operating conditions, which leads to larger pumps and poor thermal performance.

Accordingly, the present invention can optionally provide, at least in part, a reduction of heat input from the pumping system at critical fuel system thermal conditions. The steady state flow required from the actuation pump is small for most critical thermal conditions. When operating at small displacements the variable pump is very insensitive thermally to increased pump pressure differential (delta P) relative to a fixed positive displacement actuation pump, as used in prior art systems. Because the variable pump is controlled to more closely match actuation fuel demands with a minimum amount of fuel bypassed, this can allow the actuation system to be operated at higher pressures with much less heat input into the fuel compared to such prior art systems. The ability to operate at higher actuation pump pressure with minimal thermal impact to the fuel system may allow the engine actuators to be downsized.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a schematic representation of an aircraft engine fuel system constructed in accordance with one aspect of the present invention, showing a main pump supplemented by a variable displacement pump in combination with a variable or fixed pressure regulator;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An exemplary embodiment of a fuel delivery and control system 100 of the present invention is illustrated in FIG. 1. The fuel delivery and control system 100 includes, in its simplest form, a fuel supply, indicated generally at 102, a main fuel supply loop, indicated generally at 104, including a fixed, positive displacement pump 106 (hereinafter referred to as the main pump 106) for providing fuel to the engine during normal or steady state operating conditions, an actuation supply loop, indicated generally at 108, including a variable displacement, actuation pump 110 (the actuation pump 110) to supply high pressure hydraulic fluid to auxiliary engine components, a pump flow sharing system, indicated generally at 114 interconnecting the main supply loop 104 and the actuation loop 108 to integrate/combine pump flows when required, a fuel metering unit (FMU), indicated generally at 116, for metering fuel to the turbine engine and a fuel bypass loop, indicated generally at 118. It will be understood that FIG. 1 is a schematic representation of the present invention and illustrates only one example of the configuration of the system 100, which can be implemented in any number of ways, as will be known to those skilled in the art.

As shown in FIG. 1, the fuel supply 102 preferably includes a fuel tank 122 and a boost pump 124. The boost pump 124 supplies fuel to both the main pump 106 and the actuation pump 110. The boost pump 124 generates a low pressure source Pb that is divided into two supply lines, indicated at 130 and 132, respectively. The boost pump 124 can be, for example, a centrifugal pump to provide fuel at a sufficient pressure to the inlet of each of the main pump 106 and actuation pump 110, as will be well known to those skilled in the art. Note that fluid flow is indicated by directional arrows as provided in FIG. 1. It will be appreciated that the lines 130 and 132 may each include at least one check valve and/or fuel filter (not shown), as will also be well known to those in the art.

The main engine fuel supply loop 104 includes the low pressure, Pb, fuel supply line 130 in fluid communication with the input end 105 of the main pump 106. A high pressure outlet line 140, in fluid communication with the outlet 107 of the main pump 106, delivers fuel at the required flow rate and at a fuel pressure indicated as Ps1, to the pump flow sharing system 114, as will be described in more detail below. A relief line 142 including a high pressure relief valve (HPRV) 144 is also provided to control the maximum pressure supplied to the fuel metering unit 116. A recirculation or bypass line, indicated at 150 is provided for recirculating fluid flow back to the low pressure, input end 105 of the main pump 106. The recirculation bypass line 150 can include a bypass valve (not shown) as will be appreciated by those skilled in the art.

The main pump 106 is preferably sufficiently sized to meet engine burn flow (Wf) demands ranging from above windmill through cruise conditions. Accordingly, it will be appreciated that since the main pump 106 is sized to deliver fuel at a rate that more closely matches engine demand during most thermally critical engine conditions, the amount of high pressure bypass/recirculated flow is minimized. By sizing the main pump 106 in this manner, whereby the excess flow capacity needed for maximum or high engine fuel flow conditions has been shifted to the actuation pump 110 and is bypassed at low pressure within the actuation loop 108 until the flow is needed, less heat is generated within the main supply loop 104 during such steady state conditions. Further, as will be appreciated, the man pump 106 is of sufficient size to meet the pressure and flow requirements during these engine steady state operating conditions, yet it need not be sized to generate the pressure required to meet windmill relight or high flow conditions and/or meet the pressure and flow requirements of the actuation system. As such, the main positive displacement pump 106 can be smaller in size, and thus of a lower weight than the main fuel supply pumps of conventional fuel flow systems.

In one embodiment, for example, the main pump 106 is sized to provide approximately about 20% of the combined pump flow capability while the actuation pump 110 provides approximately about 80% of the combined flow capability. As described in more detail below, the combined flow from the two pumps, indicated generally as number 264 in FIG. 1, is sufficient to meet the engine flow demand for windmill relight and maximum flow conditions required by the engine.

For certain other applications, the main pump 106 can be sized to supply engine burn flow Wf for windmill start and/or other conditions beyond cruise. For certain other applications, the main pump 106 can also be sized to supply flow for engine functions other than utilize fuel flow, such as providing flow to at least a portion of the engine's actuators, valves and other hydraulic systems, as will be appreciated by those skilled in the art. As such, the about 80/20 flow division between the two pumps is merely one example of the type of flow sharing or division contemplated by the present invention. Preferably, however, to minimize heat dissipation to the fuel stream, the actuation pump 110 of the fuel delivery and control system 100 is sized to provide a larger portion of the total engine flow demand during windmill relight and maximum flow conditions that of the main pump 106.

The actuation loop 108, in its simplest form, includes the low pressure, fuel supply line 132 in fluid communication with the input end 111 of the actuation pump 110 and a high pressure outlet line 160 having a line discharge pressure, indicated as Ps2 in FIG. 1, in fluid communication with the output end 113 of the actuation pump 110. The actuation loop 108 further includes an actuation system supply line, indicated generally at 162, for providing hydraulic fuel to the engine actuators and/or valve components. The system 100 can optionally include a pressure regulating line 164 in fluid communication with a pressure regulator assembly 170. A high pressure relief line 166 including a high pressure relief valve (HPRV) 168 can be further included to control the maximum pressure in the actuation loop 108. A line 163 connects the output end 113 of the actuation pump 110 to the pump flow sharing system 114 so that the flow may be selectively directed to the main engine supply line 264 when required.

The actuation pump 110 is preferably a variable displacement pump including a pump control system, indicated generally at 196. The actuation pump 110 is sized to provide approximately about 80% of the combined flow capability of the system, e.g. 80% of the engine fuel flow requirement at maximum fuel demand conditions. However, it will be appreciated that the actuation pump 110 is of a sufficient size to provide actuator steady state plus transient flow to assure positive operation of the actuators, and also to account for leakage and servo flow. In addition, the actuation pump 110 is sized to supplement the main pump 106 to provide the necessary make-up flow to the engine during peak demand operating conditions.

The actuation pump 110 is controlled to maintain a minimum discharge pressure Ps2 that is sufficient to meet the actuation system pressure demand. Such a pressure is achieved by utilizing the pressure regulator 170, which is preferably a variable pressure regulator, to adjust the discharge pressure Ps2 in accordance with the actuation system pressure requirements. As such, the actuation pump 110 can be controlled to the minimum discharge pressure Ps2 and minimum flow required for steady state engine conditions, when the main pump and actuation pumps are isolated from each other. The discharge pressure can be readily increased or decreased when required by actuation system requirements.

It will be appreciated that because the actuation pump 110 no longer contributes to supplying fuel at a pressure required by the fuel nozzles/fuel metering system during steady state and/or thermally critical conditions, in isolated pumps mode, the actuation pump 110 discharge pressure Ps2 will be preferably lower than the discharge pressure Ps1 of the main pump 106. Such a minimum discharge pressure Ps2 is achieved by utilizing the pressure regulator 170 to adjust the pressure output of the actuation pump 110 in accordance with actuation system pressure requirements. In the isolated pumps mode, the variable pressure regulator 170 can be used to temporarily increase Ps2, to a pressure that may be temporarily higher than Ps1 at steady state conditions, when engine conditions required moving the actuators ("actuator transient conditions"). However, Ps2 is lowered back to the minimum required system pressure when the actuation system returns to steady state conditions. In certain embodiments of the present invention, the pressure regulator 170 can be used to increase the discharge pressure Ps2 and bypass flow from the actuation pump 110 can thus be used to increase fuel temperature for cold starts when fuel temperatures are below freezing.

The variable displacement actuation pump 110 is controlled to provide the minimum amount flow required to meets engine requirements. The pump displacement can be controlled either hydro-mechanically and/or with the FADEC to provide the flow required to supply actuation, servos, leakages, and pressure regulator, when in isolated pump mode. At nearly all steady state conditions, when the pump 110 is in the isolated pumps mode, the displacement of the actuation pump 110 is set to a fraction of the available pump displacement. This results in a significant reduction in the amount of bypass flow. The actuation pump provides much less than its total flow capacity in isolated pumps mode, which results in a significant reduction in wasted energy.

Accordingly, the actuation pump 110 can be sized to supply approximately about 80% of the combine flow capability, or 80% of the peak or maximum fuel demand of the engine. It will be appreciated that the 80-20 flow division between the actuation and the main pump is presented as only one example of the type of flow sharing or flow balancing contemplated by the present invention. Indeed, the division of burn flow, leakage and cooling flow functions between pumps can vary depending on a given application.

Further, as illustrated in FIG. 1, the fuel delivery and control system 100 of the present invention includes the flow metering unit (FMU) 116 comprising a fuel metering valve 280 set with a suitable servo-controller, such as a electrohydraulic servo-valve (EHSV), indicated generally at 282, which is in turn controlled by the full authority digital electronic controller (FADEC) (not shown). A pressurizing/shutoff valve 300 in fluid communication at the outlet of the fuel metering valve 280 (shown at pressure P2) is provided to regulate the pressure drop across the fuel metering valve 280. The valve 300 includes an outlet 302 for supplying fuel at engine burn demand flow rate (Wf) to the engine combustion system, and can be completely closed during engine shut down. As will be appreciated by those skilled in the art, fuel supply in excess of engine demand can be recirculated through the bypass line 150 and directed back to the low pressure inlet of the main pump 106.

Operation and control of the fluid delivery system 100 is described. In particular, the fuel delivery and control system 100 of the present invention includes an isolated pumps mode, wherein the main fuel supply loop 104 is isolated from the actuation loop 108. Preferably, the system 100 is in the isolated pumps mode during operating conditions with Wf demand from above windmill start through cruise conditions, the most thermally critical engine conditions, wherein the engine is operating at substantially steady state conditions. The majority of the engine operating time is spent at these steady state conditions. More specifically, during these conditions, the high pressure discharges of each of the pumps 106 and 110 are completely isolated from each other.

In the isolated pumps mode, the actuation supply loop 108 operates to supply fuel to the actuation system supply line 162 at the minimum required discharge pressure, Ps2, and minimum fuel flow sufficient to operate the actuation system, including leakage and cooling flows, as determined by engine controls. In the isolated pumps mode, the minimum required pressure may vary depending on a particular engine operating condition, as will be well known to those skilled in the art. If discharge pressure is less than the required minimum pressure of the actuation system, the pressure regulator 170 will be used to correct for this variance, as described. When the discharge pressure exceeds a maximum predetermined pressure the relief valve 168 opens/unseats and allows fluid flow back to the pump inlet. As recited above, in the isolated pumps mode, the variable displacement actuation pump 110 delivers fuel at a rate that more closely matches actuator demand, as such, the amount of pressurized bypass/recirculated flow is minimized, as well as the heat generated thereby.

The variable pressure regulator assembly 170 allows the actuation pump 110 delta P to be varied so that the minimum delta P required to operate the actuators and EHSVs can be maintained across the actuation pump 110 during these operating conditions. Alternatively, if a fixed pressure regulator is used, the regulator is set to maintain the actuation pressure at the maximum pressure needed to supply the actuation system to minimize pump heat input. Maintaining a low delta P across the actuation pump 110 and setting the minimum pump displacement significantly reduces the amount of waste heat generated by the pumping system.

The pressure regulator assembly 170 allows the variable pump delta P across the variable displacement pump 110 to be quickly increased for actuator transients. Completely isolating the actuation supply from the Wf supply eliminates the affect of actuation transients on Wf. The pressure regulator assembly 170 can also be used to increase variable pump delta P and therefore increase the fuel temperature for cold starts when fuel temperatures are below freezing. Further, the steady state displacement of the variable actuation pump 110 is small for most critical thermal conditions, which minimizes bypass flow and the thermal impact thereof. It will be appreciated that because the actuation pump 110 no longer needs to meet the high pressure fuel demand of the engine nozzles at these conditions, the actuation pump can be operated at a lower discharge pressure Ps2 than the discharge pressure Ps1 of the main supply pump 106 for substantially all thermally critical conditions and/or steady state conditions.

In the isolated pumps mode, the main supply loop 104 provides engine burn flow supply to the FMU 116. In this operational position, the flow sharing system 114 functions to permit only the output flow from the main supply pump 106 to the line 264 in communication with the FMU 116. As such, it will be appreciated that the pressure and flow in the line 264 is substantially the same as the discharge pressure Ps1 and flow rate in the line 140 at the outlet of the main pump 106 minus the bypass flow in line 150. As recited above, the main pump 106 is sized to deliver fuel at a rate that more closely matches engine demand, the amount of high pressure bypass/recirculated flow is minimized, as well as the heat generated thereby. Accordingly, during such steady state operating conditions with minimal recirculation, the main pump 106 can deliver fuel at the required discharge pressure Ps1 without significant thermal impact into the main fuel supply loop 104.

As such, the fixed position main pump 106 is dedicated to supplying Wf. In particular, the high pressure flow is directed to the fuel metering unit 116 through lines 140 and 264. Additionally, because the main pump 106 supplies no actuation and EHSV flow, the FMU discharge pressurizing valve 300 can be reduced to a minimum size. Lowering the FMU discharge pressurizing valve 300 setting results in a lower main pump 106 delta P when operating on the FMU discharge pressurizing valve 300. The lower delta P results in an additional reduction in the amount of waste heat generated at these conditions.

During operating conditions with Wf demands from above cruise, at windmill relight or at other peak engine fuel demands, the fuel delivery and control system 100 of the present invention is in the shared pumps mode. When the engine Wf demand is expected to be greater than the flow capability of the main pump 106, flow sharing system 114 transitions from the two isolated pumps mode to the shared pumps mode. This allows flow from variable actuation pump 110 to be used to supply or supplement the engine burn, Wf, demand.

When in the shared pump mode, the main pump 106 discharge pressure (Ps1) and actuation pump 110 discharge pressure (Ps2) are substantially equal. In shared pump mode, the maximum engine flow demand is met by the combined output flow from the actuation pump 110 and the main pump 106. The actuation pump 110 supplies a supplemental volume of flow as needed to augment the main pump 104, depending on the amount of flow demanded by the engine. As such, the pump flow sharing system 114 in combination with the pump control 196 varies the amount of supplemental flow provided by the actuation pump 110. Excess pump flow from the actuation pump 110 may continue to recirculate through line 164 and the pressure regulator 164 and/or through the relief line 166, to the input end of the actuation pump 110. Any flow in excess of engine demand in the shared pumps mode can be bypassed back to the low pressure inlet side of the main pump 106 via the bypass system 118.

It will be appreciated that the present invention provides a variable displacement actuation pump that supplements a fixed displacement main pump, wherein the flow sharing system allows the sizing of the two pumps to be kept to the minimum. Without flow sharing the two pumps would typically be sized at different operating condition which would lead to larger pumps and poor thermal performance. Without flow sharing the main fixed displacement pump would be sized for takeoff flow. In one example of the present invention, the main pump 106 displacement would be approximately about 1.1 CI/rev. The actuation pump 110 is sized for leakage at start and the displacement would be approximately about 1.5 CI/rev. With flow sharing the combined displacement of the two pumps would be about 1.65 CI/rev.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel delivery and control system for a gas turbine engine having a maximum engine fuel flow requirement and a fuel metering unit, an actuation system requiring a minimum operating fuel flow and minimum operating pressure, the fuel control system comprising:
   a variable displacement actuation pump of a size capable of providing a first portion of the maximum fuel flow requirement of the engine, the actuation pump having an outlet and a discharge pressure; and
   a fixed displacement main pump of a size configured to provide a second portion of the maximum fuel flow requirement of the engine, the main pump having an outlet and a discharge pressure, the outlet of the main pump in fluid communication with the fuel metering unit and in selective fluid communication with the outlet of the actuation pump, wherein the fuel delivery and control system is configurable between an isolated pumps mode wherein the outlets of each of the actuation pump and the main pump are separated from each other and a shared pumps mode wherein the outlets of each of the actuation pump and the main pump are in fluid communication with each other to combine the first portion of the maximum fuel flow of the engine with the second portion of the maximum fuel flow of the engine and wherein the combined flow is supplied to the fuel metering unit of the engine.

2. The fuel delivery and control system of claim 1, wherein the actuation pump has an inlet and further comprises a pressure regulator assembly to control the discharge pressure at the outlet of the actuation pump to the minimum operating pressure of the actuation system in the isolated pumps mode.

3. The fuel delivery and control system of claim 2, wherein the pressure regulator assembly is a variable pressure regulator.

4. The fuel delivery and control system of claim 1, wherein the discharge pressure of the actuation pump is less than the discharge pressure of the main pump when the system is in the isolated pumps mode.

5. The fuel delivery and control system of claim 1, wherein the actuation pump further comprises a variable control system in fluid communication with the outlet of the actuation pump to provide fuel at the minimum operating fuel flow required by the actuation system.

6. The fuel delivery and control system of claim 1, wherein the main pump is size to provide substantially 20 percent of the maximum fuel flow requirement of the engine and the actuation pump is sized to provide substantially about 80 percent of the maximum fuel flow requirement of the engine.

7. The fuel delivery and control system of claim 1, further comprising a fuel bypass line in fluid communication with the fuel metering unit, the bypass line directing fuel back to an inlet of the main pump.

8. A fuel system for use in an aircraft engine having a maximum fuel flow demand, the fuel system comprising:
   a fixed displacement pump for pressurizing fuel from a fuel supply, the fixed displacement pump having an inlet and an outlet in fluid communication with a main fuel supply loop, the fixed pump providing fuel at a sufficient flow rate and discharge pressure to meet the demand of the engine at steady state conditions; and
   a variable displacement pump for pressurizing fuel from the fuel supply, the variable displacement pump having an inlet and an outlet in fluid communication with an actuation supply loop, the variable pump capable of providing output fuel at a sufficient discharge pressure to meet the demand of a plurality of hydraulically actuated devices, the outlet of the variable pump in selective fluid communication with the outlet of the fixed pump, wherein the discharge pressure of the variable pump is less than the discharge pressure of the fixed pump and the main fuel supply loop is isolated from the actuation loop when the outlets of the pumps are isolated and wherein the fixed pump output flow and the variable pump output flow are combined to meet the maximum fuel demand of the engine.

9. The fuel system of claim 8, wherein the fixed pump is sized to provide substantially 20 percent of the maximum fuel demand from the engine and the variable pump is sized to provide substantially about 80 percent of the maximum fuel demand of the engine.

10. The fuel system of claim 8 further comprising a regulator valve assembly in communication with the variable pump for controlling the pressure drop across the inlet and the outlet of the variable pump.

11. The fuel system of claim 10, wherein the regulator valve assembly comprises a variable pressure regulator.

12. The fuel system of claim 8 further comprising a control valve in communication with a regulator valve assembly, the control valve configured for setting a pressure differential across the variable pump.

13. The fuel system of claim 8 further comprising a pumps flow sharing system selectively connecting the outlet of the variable pump and the outlet of the fixed pump.

14. A dual pump fuel supply system for delivering fuel to a fuel metering unit of a gas turbine engine having a maximum fuel demand, the fuel supply system comprising:

a fixed delivery main fuel pump having an input and an output in fluid communication with the fuel metering unit; and
a variable actuation pump having an input and an output;
a flow sharing system interconnecting the fixed pump and the variable pump, the flow sharing system having a first configuration wherein the flow output of the fixed pump is isolated from the flow output of the variable pump and a second configuration wherein the flow output of the fixed pump is combined with the flow output of the variable pump, wherein the combined outputs are supplied to the fuel metering unit of the engine.

15. The dual pump fuel supply system of claim 14, wherein the variable pump further comprises a pressure regulator assembly to control the pressure drop across the input and output of the variable pump.

16. The dual pump fuel supply system of claim 15, wherein the pressure regulator assembly is a variable pressure regulator.

17. The dual pump fuel supply system of claim 16, wherein the variable pump is sized to provide fuel at a sufficient pressure and flow rate to a plurality of hydraulically actuated devices within the engine.

18. The dual pump fuel supply system of claim 14, wherein the variable pump further comprises a variable control system in fluid communication with the output of the variable pump and the flow sharing system.

19. A method of delivering fuel to an aircraft engine having a maximum fuel demand, the method comprising:
providing a fixed displacement pump in a main fuel supply loop having an outlet and capable of providing fuel at a discharge pressure, the fixed displacement pump sized to supply a first portion of the maximum fuel demand of the engine;
providing a variable displacement pump in an actuation supply loop having an outlet in selective fluid communication with the outlet of the fixed displacement pump, the variable displacement pump capable of providing a second portion of the maximum fuel demand of the engine that is larger than the first portion; and
alternating between an isolated pumps mode wherein the variable displacement pump provides fluid flow to an actuation system of the engine at a minimum required discharge pressure such that the main fuel supply loop is isolated from the actuation supply loop and a shared pumps mode wherein the flow output of the fixed displacement pump and the flow output of the variable displacement pump are combined to provide the maximum fuel demand required by the engine.

20. The method of claim 19 wherein in the isolated pumps mode, the discharge pressure of the variable displacement pump is less than the discharge pressure of the fixed displacement pump.

* * * * *